Feb. 4, 1930.    N. A. HALLWOOD    1,745,671
SCALE
Filed June 7, 1928
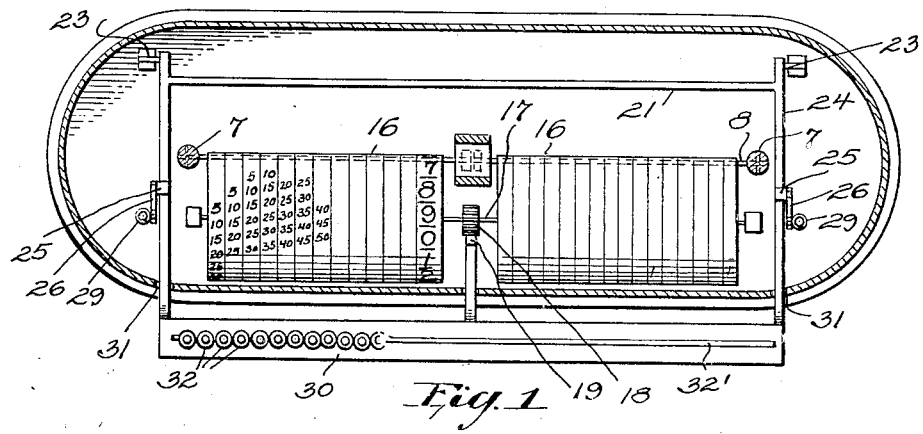
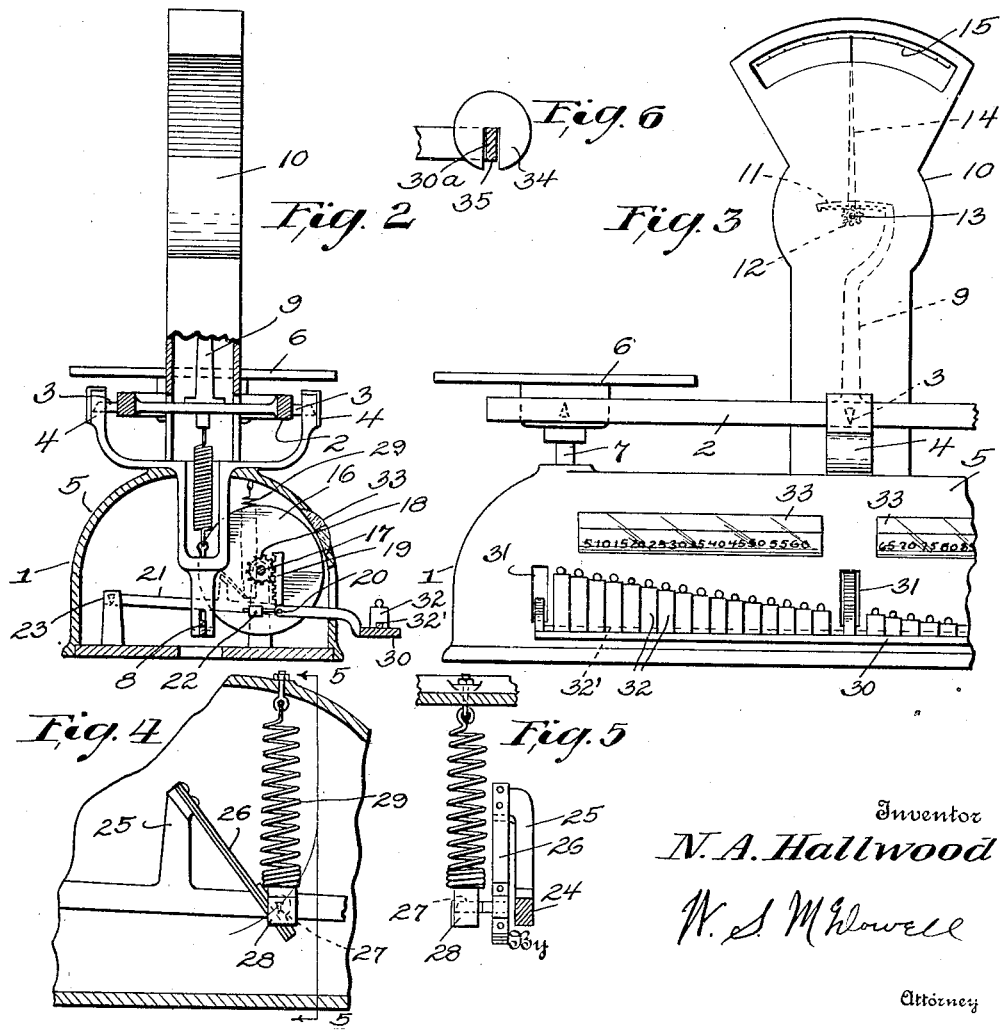
Inventor
N. A. Hallwood
W. S. McDowell
Attorney Patented Feb. 4, 1930

1,745,671

UNITED STATES PATENT OFFICE

NATHAN A. HALLWOOD, OF COLUMBUS, OHIO

SCALE

Application filed June 7, 1928. Serial No. 283,621.

This invention relates to improvements in scales, and has particular reference to an improved price computing attachment for use in connection with even balance types of scales, that is, scales of the character provided with pivotally mounted beams which are adapted to carry equal weights at the opposite ends thereof. Very considerable difficulty is encountered in the matter of effecting quickly and accurately price computations in the operation of the even balance type of scale. Such computations have largely been made by rapid mental operations on the part of the scale attendant. However, this ordinary method is not desirable in that error occurs frequently so that the full weighing accuracy of this exceedingly sensitive type of scale is not, as a matter of practice, actually obtained.

The present invention therefore, provides in a scale of this character a computing mechanism which in operation reduces the liability of error in the operation of even balance types of scales, and enables the scale attendant to perform successively weighing operations with different products and with different price values rapidly and accurately and with but a minimum amount of error.

The invention consists in providing the base of an even balance type of scale with a computing drum arranged adjacent to a lens provided opening formed in the base or housing of the scale. The drum is rotated by means of a pivoted frame arranged within the base and formed to include an exteriorly disposed bar. The bar carries a plurality of removable weights which when removed from the bar permit the frame to respond to the influence of a constantly operating spring mechanism so that the drum will be rotated to an extent commensurate with the weight or weights removed from the bar. This brings various price computing data into registration with the reading line provided in connection with the drum reading lens. When the desired price appears on the drum the operator transfers the removed weights from the bar to the weight receiving platter of the scale. Commodities are then applied to the opposite side of the scale and when the beam reaches a position of balance the operation is complete.

For a further understanding of the invention reference is to be had to the following description and the accompanying drawings, wherein:

Figure 1 is a horizontal sectional view taken through the base of a scale provided with the improved computing mechanism comprising the present invention.

Figure 2 is a transverse vertical sectional view taken through the scale and illustrating more fully the construction and position of the computing mechanism therein, Figure 3 is a front elevation of a scale constructed in accordance with the present invention, Figure 4 is a transverse vertical sectional view through the scale base and illustrating the spring mechanism used for operating the computing drum, Figure 5 is a vertical sectional view on the line 5—5 of Figure 4, Figure 6 is a view of a slightly modified form of weight means.

Referring more particularly to the drawings, the numeral 1 designates what is known as the even balance type of scale. Generally, scales of this type include a beam or lever 2 which by means of knife edged fulcrums 3 is pivotally mounted at approximately its center on bearings 4 stationarily carried by the base 5 of the scale. The opposite ends of the beam are provided with pivotally mounted weight receivers 6, one of which being adapted to receive the commodities to be weighed while the other receiver is employed to retain the fixed or known weights. The stems 7 of the weight receivers project into the base of the scale and are connected, as usual, with a pivotally mounted check rod 8. To indicate the degree of deflection of the beam, in normal position there is provided an indicating mechanism which consists of an upright arm 9 carried by the central portion of the beam 2. This arm is fixed to oscillate in a stationarily indicating tower 10 mounted upon and arising from the base 5. In this instance the upper end of the arm 9 terminates in a segmental rack 11, the teeth of which meshes with a pinion 12 mounted upon a shaft 13. This shaft carries a fixed indicating pointer 14 which is movable over a fixed graduated or dialed surface 15. By watching the positions of the pointer with reference to the surface 15 the operator of the scale may readily determine when the beam is in a normal or balanced position.

As previously stated, it is very difficult in the operation of scales of this character to readily and accurately figure or translate price values into terms of weight measurement. On the ordinary spring or pendulum type of scale computing drums have been used for a long time to provide simple and convenient means for determining price values, in response to applied weights but to the best of my knowledge such computing mechanism has never been employed in connection with an even balance type of scale of the character above described for the reason that the inherent construction and design of such a scale renders ordinary computing mechanism valueless. In the spring type of scale, for example, the beam is deflected from the normal position to an aggressive extent by the application of progressively increasing loads to the weight receiver or, in other words, the greater the load the greater will be the deflection of the beam from a normal position. Due to this construction it is a simple matter to transfer the motion of the beam to a computing drum or other form of price and weight indicator. In the even balance type of scale, however, the beam constantly returns to normal irrespective of the load applied, and for this reason a computing drum cannot be directly connected with the scale beam. My construction for accompanying an accurate computation in connection with an even balance scale consists in providing the interior of the scale base 5 with a rotatable computing drum 16. This drum is fixed to rotate about its longitudinal axis through the medium of a suitably journaled shaft 17 which extends axially through the drum and is carried by bearings formed in connection with the base 5. The center of the shaft 17 in this instance is provided with a pinion 18, which meshes with a rack 19, which is pivotally carried as at 20 upon the intermediate portion of a drum operating frame 21, the rack 19 being under weight as at 22 so that it will be normally maintained in proper engagement with the teeth of the pinion 18.

The frame 21 is pivotally mounted by means of knife edged fulcrums in connection with bearings 23 arising from the base 1, and the side bars 24 of said frame are provided with upstanding lugs 25 to which are longitudinally connected thermostatic links 26, the outer ends of these links being adapted to carry knife edged fulcrums 27 which engage with blocks 28 carried by the lower ends of adjustable coil springs 29, the latter being suspended within and from the base 5. The normal tendency of the springs 29 is to lift the frame 21 and to rotate thereby the drum 16.

This tendency on the part of the frame 21 I have obviated by means of a longitudinally extending bar 30, which forms a part of the frame 21 and extends exteriorly of the base 5 along the front of the latter, as shown in Figures 2 and 3. It will be understood that the side bars of the frame extend through slots 31 provided in the front of the base 5 so as to be held for limited oscillation on the part of the frame 21. The longitudinally extending bar 30 is equipped with a plurality of graduated known weights 32 which have their under sides notched for the reception of a rib 32' formed longitudinally on the bar 30.

In operation the scale attendant removes one or more of the weights 32 from the bar 30 which results in allowing the frame 21 to be rocked by reason of the lessened resistance on the springs 29. This elevation of the frame 21 results in the rotation of the drum which is revolved a measurable distance from its original or normal position, thereby bringing different price and weight valuations into the view of the scale operator through the reading lens 33. When the operator notes that the desired valuation has been reached the weights taken from the bar 30 are transferred to the known weight receiving platter of the scale 1. The body to be weighed is then applied to the platter of the scale until the beam reaches a state of balance, which may be determined by the indicator mechanism provided in the tower 10.

In view of the foregoing it will be seen that the computing mechanism is largely mechanical in its operation, in that it does not require any mental figuring on the part of the operator and requires no further attention than that which is given to the computing mechanism of the ordinary spring type of scale. It will be observed that when the desired valuations appear on the drum, as observed through the reading lens, which may be secured through a merely mechanical operation, the known weights of ascertained value are then transferred to the weight platter of the scale, and the scale is then operated in the common manner. There are, of course, various modifications of the invention which may be resorted to in view of the mechanism herein specifically described. For example, as shown in Figure 6, the weights may be in the form of circular discs 34 which are provided with slots 35 and receivable on the bar 30$^a$. Obviously other modifications may be resorted to without departing from the scope of the invention. I have found it advisable to use the thermostatic links 26 for the reason that these links respond to temperature changes and maintain the computing drum under all conditions of temperature at a zero position. This is, however, a refinement which may not be used in cheaper scale designs.

What is claimed is:

1. In an even balance scale, a base, a computing drum rotatably mounted in said base, a pivoted frame carried by said base and including a longitudinally extending bar arranged exteriorly of the base, motion transmitting devices between said frame and said drum, a spring connected with said frame and tending to move the latter in a predetermined direction, and a plurality of weights carried by the exteriorly disposed portion of said frame and serving to enable the frame to resist the action of the spring means thereon.

2. A price computing mechanism for scales comprising a base, a pivotally mounted frame arranged on said base, a movable indicator, motion transmitting means between said frame and said indicator, a spring between the intermediate portion of said frame and said base and serving to move said frame in a predetermined direction, and a plurality of weights of known value carried by the outer portion of said frame and serving to enable said frame to resist the action of said spring, the removal of one or more of said weights from said frame permitting said spring to move said frame through increments of travel proportioned to the value of the weight or weights removed from the frame.

3. In price computing mechanism for scales, a base, a pivotally mounted frame, an indicating drum rotatably carried by said base, motion transmitting means between said frame and said drum, a resistance element connected with said frame and tending to move the latter in a predetermined direction, and a plurality of removable weights carried by the outer portion of said frame and serving to counteract the influence on said frame of said resistance element.

4. A computing mechanism for scales comprising a casing having a lens covered opening in one of the walls thereof, a drum rotatably mounted within said casing and having the peripheral portion thereof provided with price indicating data arranged to register with the lens opening, a pivotally mounted frame carried by said base, motion transmitting devices between said frame and said drum, whereby said drum is revolved by the oscillating movement of the frame, a resistance element connected with said frame and tending normally to move the latter in a predetermined direction, and a plurality of removable weights of known value carried by the outer portion of said frame, said weights serving to counteract the influence of said resistance element on said frame.

5. In a computing attachment for even balance scales, comprising a casing having a lens covered opening formed in one of the walls thereof, a rotatable drum situated contiguous to said opening and having peripheral portion thereof provided with price indicia, a pivoted frame carried by said base and including an exteriorly arranged longitudinally extending support, motion transmitting devices between said drum and said frame, a spring tending to move said frame in a predetermined direction, a thermostatic link between the free end of said spring and said frame, and a plurality of weights of known or predetermined value carried by said frame support and serving to counteract the influence on said frame of said resistance element.

In testimony whereof I affix my signature.

NATHAN A. HALLWOOD.